(12) United States Patent
Eguchi et al.

(10) Patent No.: US 11,928,217 B2
(45) Date of Patent: Mar. 12, 2024

(54) INFORMATION PROCESSING APPARATUS, CONTROL METHOD OF INFORMATION PROCESSING APPARATUS, AND STORAGE MEDIUM

(71) Applicant: Canon Kabushiki Kaisha, Tokyo (JP)

(72) Inventors: Takami Eguchi, Tokyo (JP); Nobuhiro Tagashira, Chiba (JP); Ayuta Kawazu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 17/528,452

(22) Filed: Nov. 17, 2021

(65) Prior Publication Data

US 2022/0156378 A1 May 19, 2022

(30) Foreign Application Priority Data

Nov. 18, 2020 (JP) ................. 2020-191893

(51) Int. Cl.
*G06F 21/57* (2013.01)
*G06F 21/51* (2013.01)

(52) U.S. Cl.
CPC ........... *G06F 21/575* (2013.01); *G06F 21/51* (2013.01); *G06F 2221/034* (2013.01)

(58) Field of Classification Search
CPC ... G06F 21/575; G06F 21/51; G06F 2221/034
See application file for complete search history.

(56) References Cited

U.S. PATENT DOCUMENTS

| 9,880,908 B2 | 1/2018 | Jeansonne | |
|---|---|---|---|
| 2017/0235957 A1* | 8/2017 | Maletsky | H04L 63/0807 |
| | | | 713/168 |
| 2020/0082070 A1* | 3/2020 | Semeria | G06F 9/4486 |

FOREIGN PATENT DOCUMENTS

| JP | 2017531252 A | * 10/2017 | ............. G06F 12/02 |
|---|---|---|---|
| WO | WO-2005026951 A1 | * 3/2005 | ............. G06F 21/44 |

* cited by examiner

*Primary Examiner* — Lynn D Feild
*Assistant Examiner* — Abdullah Almamun
(74) *Attorney, Agent, or Firm* — Venable LLP

(57) ABSTRACT

An apparatus comprising: a unit configured to verify whether a first region that specifies a verification range of a first boot code and a second region that specifies a verification range of a second boot code have been altered; a unit configured to, when the first region has not been altered, verify whether the first boot code has been altered; a unit configured to, when the first boot code has been altered and the second region has not been altered, verify whether the second boot code has been altered; and a unit configured to, when the second boot code has not been altered, restore the first boot code using the second boot code, wherein the first and second regions are regions that are not rewritten after a start of the apparatus.

12 Claims, 8 Drawing Sheets

F I G. 5

| OFFSET | INFORMATION NAME | MEANING/REMARKS |
|---|---|---|
| 0-7 | VERSION IDENTIFIER | BIOS VERSION IDENTIFIER |
| 8-9 | NUMBER OF VERIFICATION TARGETS | NUMBER OF BIOS VERIFICATION RANGES |
| 10-15 | RESERVED REGION | |
| 16-19 | VERIFICATION RANGE START ADDRESS 1 | |
| 20-23 | VERIFICATION RANGE SIZE 1 | HEREINAFTER, REPEAT FOR NUMBER OF VERIFICATION TARGETS |
| ... | | |

FIG. 6

| BIOS VERIFICATION RANGE SETTING REGION | BIOS GOLDEN COPY VERIFICATION RANGE SETTING REGION | BIOS | OPERATION |
|---|---|---|---|
| OK | OK | OK | UPDATE GC WHEN VERSION INFORMATION DIFFERS (S714) |
| OK | FAILURE | OK | UPDATE CG (S714) |
| OK | OK | FAILURE | RESTORE (S712) |
| OK | FAILURE | FAILURE | STARTUP FAILURE (S716) |
| FAILURE | OK | — | RESTORE (S712) |
| FAILURE | FAILURE | — | STARTUP FAILURE (S716) |

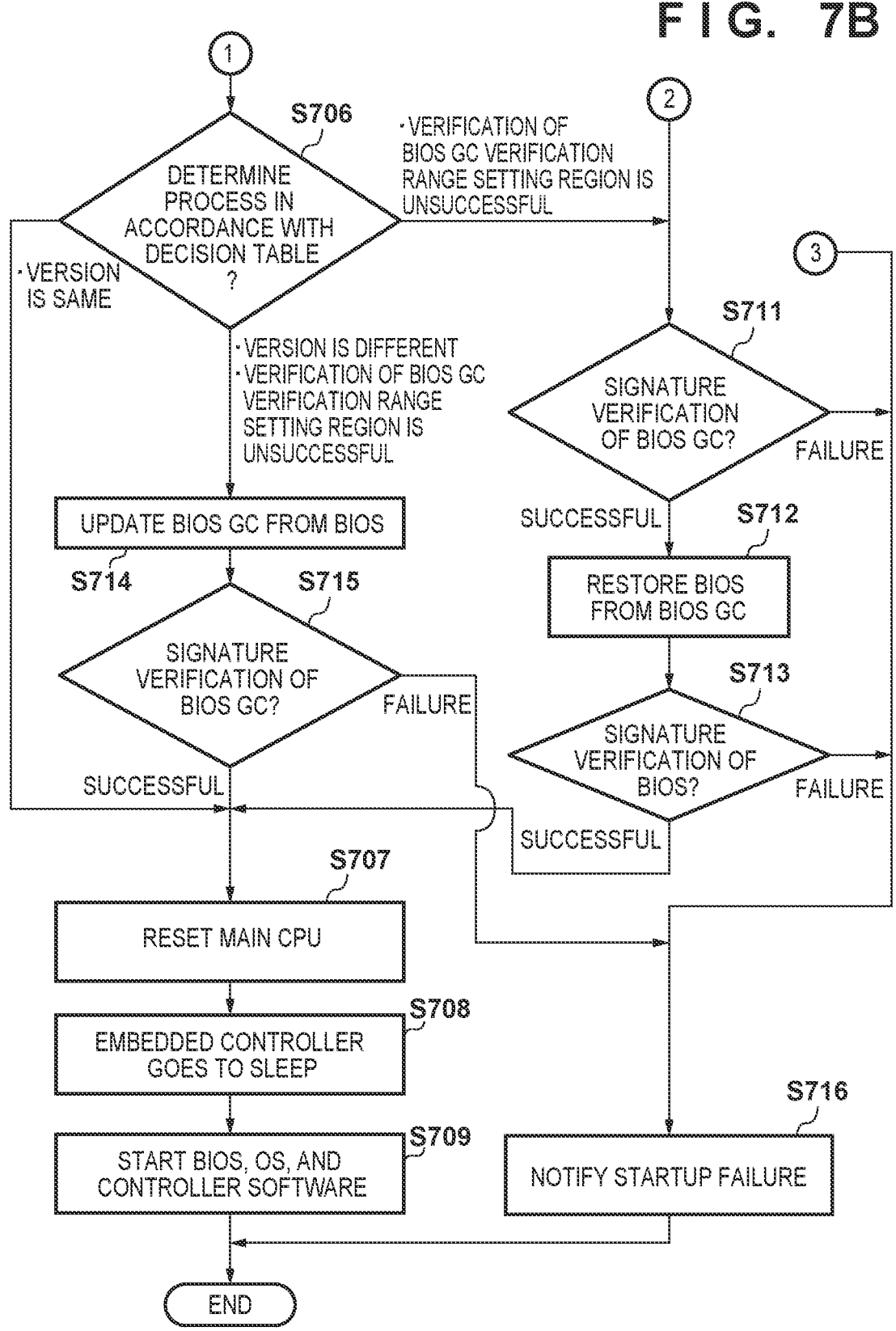

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an information processing apparatus, a control method of the information processing apparatus, and a storage medium.

Description of the Related Art

Attacks in which a third party alters software that controls an information processing apparatus by an unauthorized method to steal information assets in the information processing apparatus, and attacks in which the information processing apparatus whose software has been altered is used, have become a problem. In order to prevent such attacks, methods of verifying that software in an information processing apparatus has not been altered by a third party have been devised. In addition, methods of restoring software when it is detected that the software has been altered have been devised. Restoration methods are particularly limited for BIOS and UEFI, which are the first software that a device launches, as the stage is in an early stage of startup, and basic functions, such as a network function, cannot be used. BIOS is an abbreviation of Basic Input Output System and UEFI is an abbreviation of Unified Extensible Firmware Interface. Note that BIOS is sometimes referred to as a boot code because it is software related to the start of a device.

In the specification of U.S. Pat. No. 9,880,908, an embedded controller detects an alteration of system firmware (BIOS) held in a first memory. Then, when it is determined that the firmware has been altered, the firmware is restored by being overwritten by system firmware for restoration (BIOS golden copy), which has been held in advance in the second memory. An embedded controller will sometimes be referred to as EC below. As a result of the restoration process, the BIOS for startup, which is held in the first memory, is returned to an unaltered state, so a device can be started normally.

Note that although the first memory can be accessed from a CPU, a second memory has a bus configuration that enables access only by the embedded controller in order to prevent unauthorized rewriting of the BIOS golden copy. Further, in the specification of U.S. Pat. No. 9,880,908, BIOS in the first memory and the BIOS golden copy in the second memory are controlled by a policy so as to be the same. For example, in the case of a setting in which the policy allows rewriting of the BIOS golden copy, hash values of BIOS in the first memory and the BIOS golden copy in the second memory are compared. When the hash values differ, the BIOS golden copy in the second memory is overwritten by BIOS in the first memory so that the two are identical.

However, the specification of U.S. Pat. No. 9,880,908 does not elaborate on the range of verification of BIOS. Since BIOS has regions that are rewritten after startup, such as a setting value, there is a problem that if the entire range of BIOS is set as a verification range, signature verification would fail at the time of verification when a particular region is rewritten after a signature value is generated.

The present invention has been made in view of the above-mentioned problems and provides a technique for realizing verification even when a setting value of a boot code of software and the like have been rewritten when verifying whether or not software has been altered and performing a restoration process.

SUMMARY OF THE INVENTION

According to one aspect of the present invention, there is provided an information processing apparatus provided with a first storage medium configured to hold a first boot code and a second storage medium configured to hold a second boot code that is used to restore the first boot code, the apparatus comprising: a first verification unit configured to verify whether or not a first verification range setting region that specifies a verification range of the first boot code and a second verification range setting region that specifies a verification range of the second boot code have been altered; a second verification unit configured to, in a case where the first verification range setting region has not been altered, verify whether or not the first boot code has been altered; a third verification unit configured to, in a case where the first boot code has been altered and the second verification range setting region has not been altered, verify whether or not the second boot code has been altered; and a restoration unit configured to, in a case where the second boot code has not been altered, restore the first boot code using the second boot code, wherein the first verification range setting region and the second verification range setting region are regions that are not rewritten after a start of the information processing apparatus.

Further features of the present invention will become apparent from the following description of exemplary embodiments (with reference to the attached drawings).

BRIEF DESCRIPTION OF THE DRAWINGS

FIG. 5 is a view illustrating an example of a format of verification range setting regions according to the embodiment.

FIG. 6 is a view illustrating the relationship between each verification result and a subsequent process according to the embodiment.

FIG. 7A and FIG. 7B are a flowchart illustrating a procedure for performing a process according to the embodiment.

DESCRIPTION OF THE EMBODIMENTS

Figure 1:
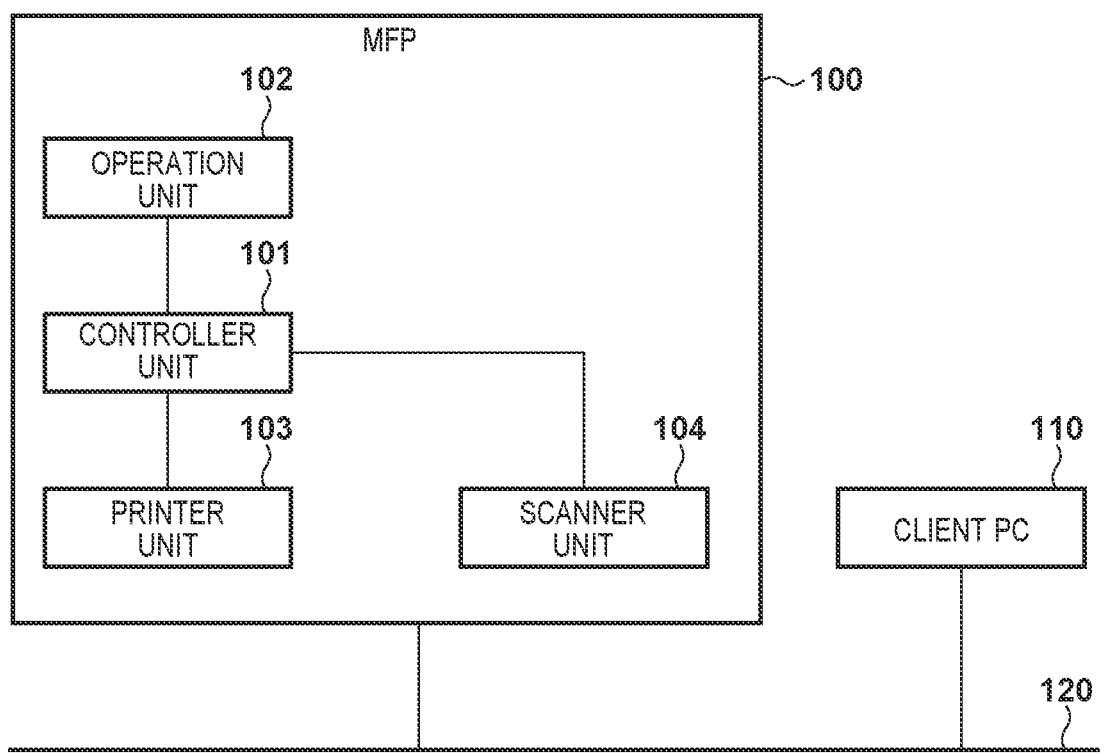
FIG. 1 is a block diagram illustrating a connection mode of an MFP and a PC according to an embodiment.

Hereinafter, embodiments are described in detail with reference to the accompanying drawings. The following embodiments do not limit the claimed invention. Although a plurality of features is described in the embodiments, not all of the plurality of features are essential to the present invention, and the plurality of features may be arbitrarily combined. Furthermore, in the accompanying drawings, the same reference numerals are assigned to the same or similar components, and a repetitive description thereof is omitted.

In the present embodiment, a restoration process for when the information processing apparatus has failed to update the golden copy, which is software for verifying and restoring the boot code, and verifyung the boot code is described. In the present embodiment, MFPs (Multi-Function Peripherals), which are image formation apparatuses, are described as examples of information processing apparatuses, but the present embodiment is a technique that can also be applied to information processing apparatuses other than multi-function peripherals. Although description is given using BIOS as an example of software, the present invention can also be applied, for example, to verify the firmware of an NIC (Network Interface Card).

<System Configuration>

The form of connection between an information processing apparatus (MFP) and a client PC according to the present embodiment is described with reference to the block diagram of FIG. 1.

An MFP 100 and a client PC 110 are connected via a LAN 120. The MFP 100 includes a controller unit 101, an operation unit 102, a printer unit 103, and a scanner unit 104.

The operation unit 102 is an operation unit for performing input and output to and from the user. The printer unit 103 outputs electronic data onto paper media. The scanner unit 104 reads paper media and converts these into electronic data. The operation unit 102, the printer unit 103, and the scanner unit 104 are connected to the controller unit 101 to realize a function as a multifunction device under the control of the controller unit 101.

The client PC 110 performs processes such as transmitting print jobs to the MFP 100.

<Hardware Configuration of the Controller Unit>

Figure 2:
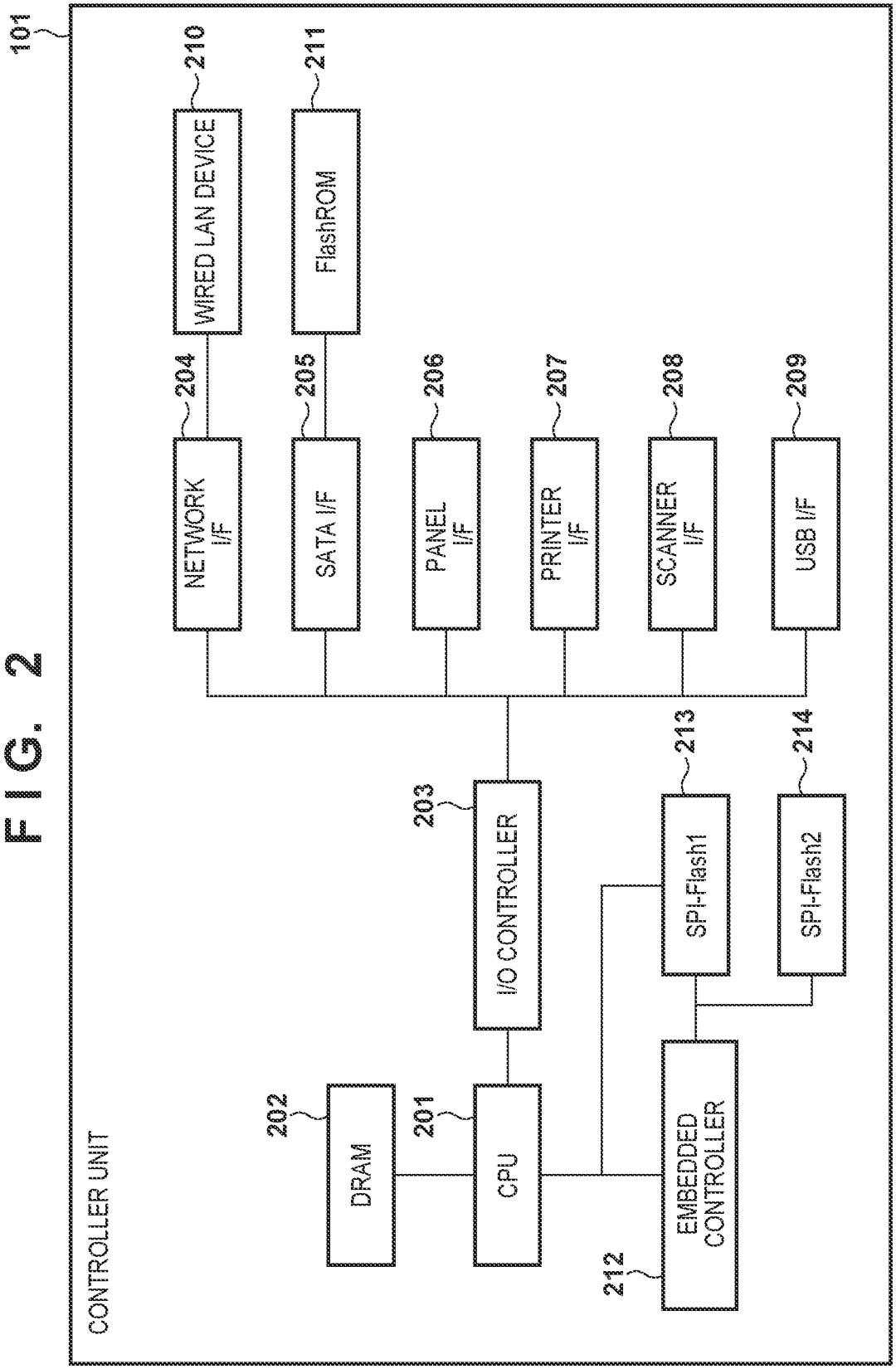
FIG. 2 is an internal configuration diagram of a controller unit of the MFP according to the embodiment.

FIG. 2 is a block diagram illustrating the details of the controller unit 101 of the MFP 100 according to the present embodiment. A CPU 201 performs the main calculation processes in the controller unit 101. Incidentally, the CPU 201 may sometimes be referred to as "main CPU" in this embodiment in order to distinguish it from the CPU with which an embedded controller 212 to be described later is provided. The CPU 201 is connected to a DRAM 202 via a bus. The DRAM 202 is used by the CPU 201 as a work memory for temporarily placing program data, which represents calculation instructions in the process of calculation of the CPU 201, and data to be processed. The CPU 201 is connected to an I/O controller 203 via a bus. The I/O controller 203 performs input and output to various devices according to the instructions of the CPU 201. A SATA (Serial Advanced Technology Attachment) I/F 205 is connected to the I/O controller 203, and a Flash ROM 211 is connected thereto. The CPU 201 uses the Flash ROM 211 for permanently storing programs and document files for implementing functions of the MFP 100. A network I/F 204 is connected to the I/O controller 203, and a wired LAN device 210 is connected to the network I/F 204.

The CPU 201 realizes communication over the LAN 120 by controlling the wired LAN device 210 through the network I/F 204. A panel I/F 206 is connected to the I/O controller 203, and the CPU 201 realizes input and output for the user to and from the operation unit 102 via the panel I/F 206. A printer I/F 207 is connected to the I/O controller 203, and the CPU 201 realizes the process of outputting paper media using the printer unit 103 via the printer I/F 207. A scanner I/F 208 is connected to the I/O controller 203, and the CPU 201 realizes the process of reading originals using the scanner unit 104 via the scanner I/F 208. A USB I/F 209 is connected to the I/O controller 203, and control of any device that is connected to the USB I/F 209 is performed. An SPI-Flash1 213 is connected to the CPU 201 by a bus and stores a control program for realizing a BIOS 360, which is described later with reference to FIGS. 3 and 4. An SPI-Flash2 214 stores a BIOS golden copy 404 (hereinafter sometimes referred to as BIOS GC), which is binary data for restoring the BIOS 360 to be described later with reference to FIG. 4. Here, SPI is an abbreviation of Serial Peripheral Interface, and an SPI-Flash is a kind of flash memory. In the present embodiment, although description is given using the SPI-Flash1 213 and the SPI-Flash2 214 as examples of a first storage medium and a second storage medium, they need not be SPI-Flash, and other types of flash memories and storage media having similar functions may be used.

The embedded controller 212 is a hardware chip that is started first after the power of the MFP 100 is turned on and performs the process of detecting alteration of the BIOS 360 to be described later, restoring the BIOS 360 using the BIOS GC 404, and updating the BIOS GC 404. The embedded controller 212 is a microcontroller that can operate independently of the CPU 201, and independent calculation processes are possible since it is separately provided with a CPU and a memory, such as a ROM and a RAM, inside. The embedded controller 212 is connected to the SPI-Flash1 213, the SPI-Flash2 214, and the CPU 201 via buses. The embedded controller 212 activates the CPU 201 by sending a reset signal to the CPU 201 after completing the process of detecting alteration of the BIOS 36) and updating the BIOS GC 404 and the like, and then it passes control. After passing control to the CPU 201, the embedded controller 212 enters a sleep state.

[Copy Function]

When performing a copy function, the CPU 201 reads program data (module data) from the Flash ROM 211 to the DRAM 202 via the SATA I/F 205. The CPU 201 detects a copy instruction from the user on the operation unit 102 via the panel I/F 206 according to the program (module) read into the DRAM 202. When the CPU 201 detects a copy instruction, it receives an original from the scanner unit 104 as electronic data via the scanner I/F 208 and stores it in the DRAM 202. The CPU 201 performs a color conversion process and the like that is suitable for outputting the image data that is stored in the DRAM 202. The CPU 201 transfers the image data that is stored in the DRAM 202 to the printer unit 103 via the printer I/F 207 and performs a process of outputting it onto a paper medium.

[PDL Printing]

When performing PDL printing, the client PC 110 issues a print instruction via the LAN 120. The CPU 201 reads program data (module data) from the Flash ROM 211 to the DRAM 202 via the SATA I/F 205. Then, the print instruction is detected via the network I/F 204 according to the program (module) read into the DRAM 202. When the CPU 201 detects the PDL transmission instruction, it receives print data via the network IF 204 and stores the print data on the Flash ROM 211 via the SATA I/F 205. When saving of the print data is completed, the CPU 201 expands the print data stored in the Flash ROM 211 into the DRAM 202 as image data. The CPU 201 performs a color conversion process and the like that is suitable for outputting the image data that is stored in the DRAM 202. The CPU 201 transfers the image data that is stored in the DRAM 202 to the printer unit 103 via the printer I/F 207 and performs a process of outputting it onto a paper medium.

<Functional Configuration of Controller Unit>

Figure 3:
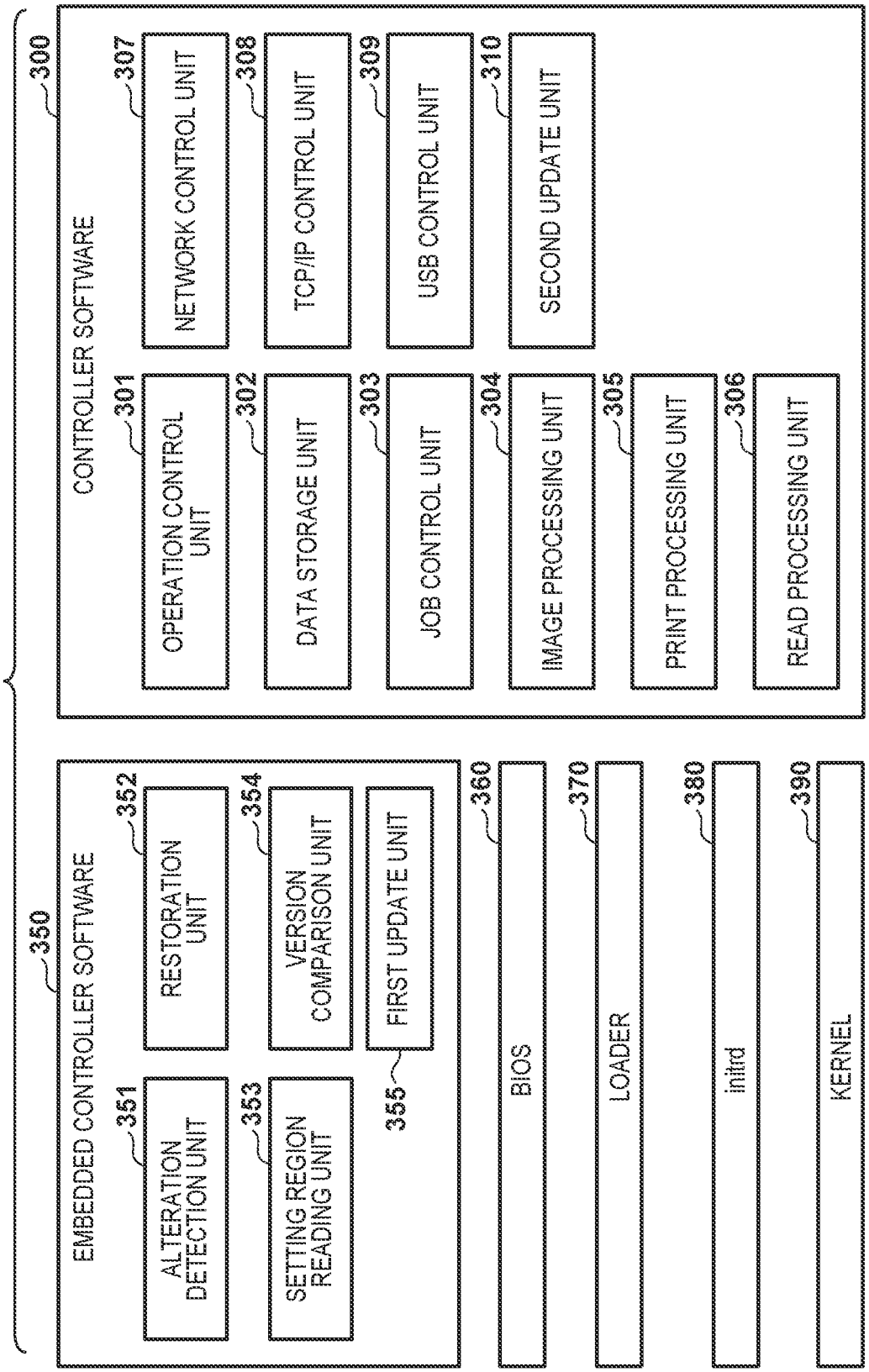
FIG. 3 is a block diagram of software that is executed in a controller of the MFP according to the embodiment.

Next, an example of a functional configuration that the software executed by the controller unit 101 of the MFP 100 according to the present embodiment realizes is described with reference to the block diagram of FIG. 3. Note that only embedded controller software 350 among the software executed by the controller unit 101 is executed by the embedded controller 212, and all others are executed by the CPU 201.

The embedded controller 212 executes the embedded controller software 350. Note that the storage location of the embedded controller software 350 may be any location so long as the embedded controller 212 can read and execute it. For example, the embedded controller software 350 may be stored in a ROM (not illustrated) provided in the embedded controller 212 or may be stored in the SPI-Flash1 213 or the SPI-Flash2 214. First, the functions of the embedded controller software 350 are described. The embedded controller software 350 includes an alteration detection unit 351, a restoration unit 352, a setting region reading unit 353, a version comparison unit 354, and a first update unit 355.

The alteration detection unit 351 verifies whether or not the BIOS 360 has been altered using a first BIOS signature value 401, which is held in the SPI-Flash1 213 and is described later with reference to FIG. 4. For example, a signature verification algorithm that uses an RSA public key cryptosystem, which is a well-known technique, or an ECDSA signature verification algorithm that uses an elliptic curve public key cryptosystem can be used as a signature verification method. A public key that is used for signature verification may be held in a ROM (not illustrated) with which the embedded controller 212 is provided or may be held in the SPI-Flash1 213 or the SPI-Flash2 214.

In addition, the alteration detection unit 351 also is provided with a function of verifying whether or not the BIOS GC 404 has been altered using a second BIOS signature value 406, which is held in the SPI-Flash2 214 and is described later with reference to FIG. 4.

Furthermore, the alteration detection unit 351 is provided with a function of verifying whether or not a first verification range setting region 403 has been altered using a first verification range setting region signature value 402, which is held in the SPI-Flash1 213 and is described later with reference to FIG. 4. Furthermore, the alteration detection unit 351 is provided with a function of verifying whether or not a second verification range setting region 408 has been altered using a second verification range setting region signature value 407, which is held in the SPI-Flash2 214 and is described later with reference to FIG. 4.

The restoration unit 352 has a function of restoring the BIOS 360 by using the BIOS GC 404 that the SPI-Flash2 214 holds when the alteration detection unit 351 detects the alteration of the BIOS 360. As for the restoration method, it is possible to realize restoration by erasing the BIOS 360 of the SPI-Flash1 213 and writing the BIOS GC 404 that has been read from the SPI-Flash2 214 to that vacant region, for example.

Since the BIOS GC 404 is copy data of the BIOS 360, the BIOS 360 can be restored to a normal state by overwriting the altered BIOS 360 with the BIOS GC 404 as described above. At that time, the overwriting of the first BIOS signature value 401 with the second BIOS signature value 406 is similarly performed. Further, the overwriting of the first verification range setting region 403 and the first verification range setting region signature value 402 respectively with the second verification range setting region 408 and the second verification range setting region signature value 407, which is described later, is performed.

The setting region reading unit 353 reads the first verification range setting region 403 that the SPI-Flash1 213 holds or the second verification range setting region 408 that the SPI-Flash2 214 holds, which is described later with reference to FIGS. 4 and 5. The setting region reading unit 353 operates after the alteration detection unit 351 confirms that the first verification range setting region 403 or the second verification range setting region 408 has not been altered as is described later in FIG. 7A and FIG. 7B. The first verification range setting region 403 or the second verification range setting region 408 is a region for specifying a verification range. The formats thereof are configured by a version identifier, which is version information of the BIOS 360; the number of verification targets, which indicates the number of verification ranges of BIOS; and a plurality of verification range start addresses and verification range sizes that correspond to the number of verification targets as illustrated in FIG. 5 as an example. In the illustrated example, a verification range start address 1 and a verification range size 1 are illustrated, and a verification range start address 2, a verification range size 2, and so on will follow thereafter in the same manner.

When a hash value is calculated for non-continuous regions excluding the regions in which the setting values and the like are rewritten in the BIOS 360 and then an electronic signature is generated, the verification ranges become plural, and the number of verification targets become 2 or more.

The version comparison unit 354 compares the version information of the first verification range setting region 403, which is the version information of the BIOS 360, and the version information of the second verification range setting region 408, which is the version information of the BIOS GC 404. It is possible to apply commonly used version information as the version information; for example, it is possible to express it in an incremental value, which represents an update and release history of the software in chronological order.

Specifically, when the present version information of BIOS is set to "1.0", the version information of the BIOS that has been updated or released due to bugs, function addition, vulnerability correction, and the like can be expressed in a numeral value, which has been incremented to "1.1". In this case, since "1.1">"1.0" as a result of comparing the version information, it can be determined that the BIOS that has the version information "1.1" is a new BIOS. The version comparison unit 354 can determine whether the version of the BIOS 360 or the BIOS GC 404 is newer by comparing the version information of the BIOS 360 with the version information of the BIOS GC 404.

Note that the above version information is merely an example, and numerical values and alphabet letters may be mixed in the version information. For example, setting the current version to "1.0a" and the new version to "1.0b" enables the use of alphabetical order (the magnitude relationship of a<b<c< . . . <z) as a representation of a chronological update history.

When the version comparison unit 354 determines that the BIOS 360 is the newer version than the BIOS GC 404, the first update unit 355 updates the BIOS GC 404 using the BIOS 360. As for a specific update method, it is possible to realize an update by erasing the BIOS GC 404 in the SPI-Flash2 214 and writing the BIOS 360, which has been read from the SPI-Flash1 213, to the vacant region that was created by erasure, for example. Similarly, the first update unit 355 rewrites to the signature value that corresponds to the updated BIOS GC 404 by overwriting the second BIOS signature value 406 with the first BIOS signature value 401. Similar, the second verification range setting region 408 and the second verification range setting region signature value 407 is rewritten with the first verification range setting region 403 and the first verification range setting region signature value 402, respectively.

Figure 4:
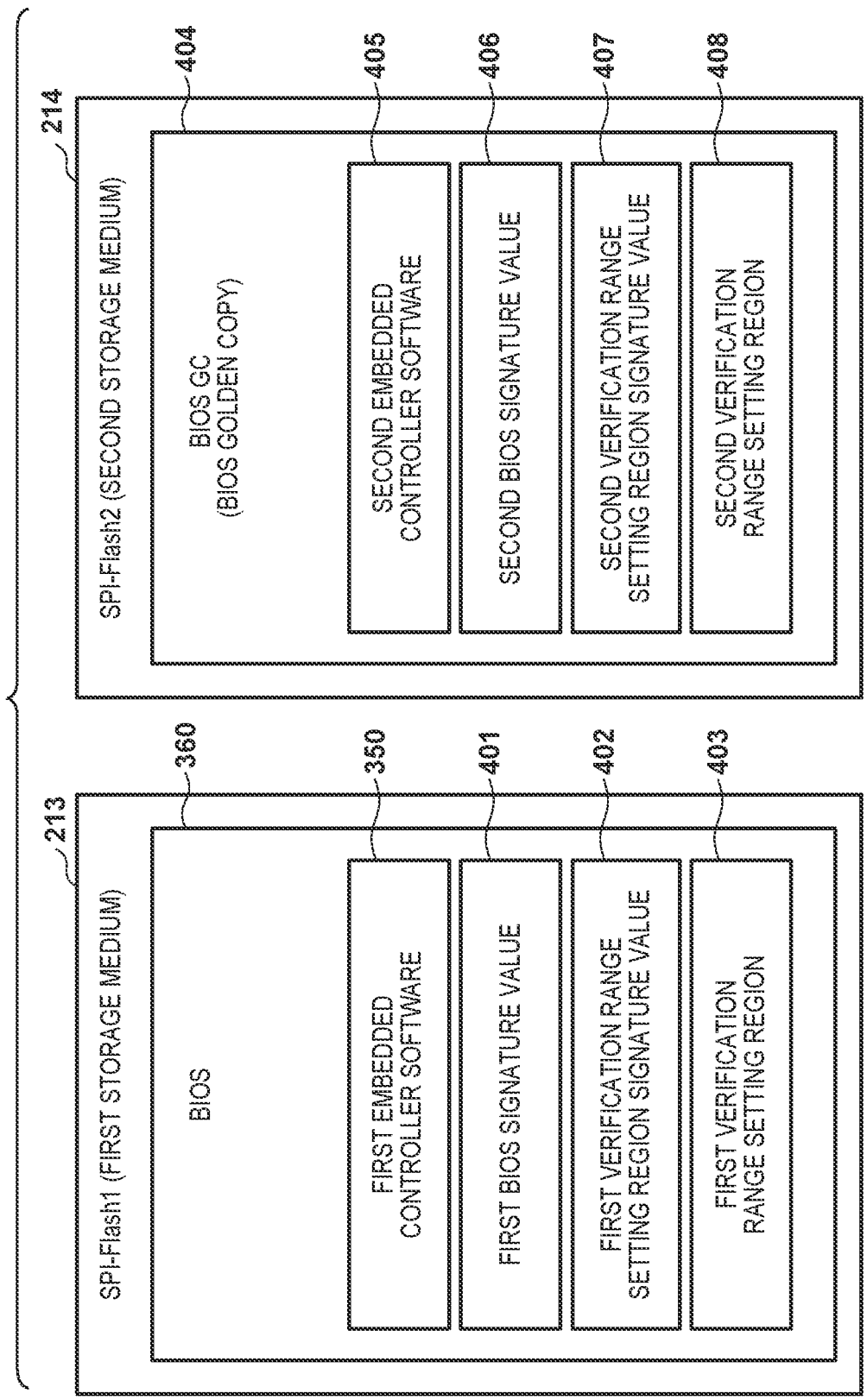
FIG. 4 is a view illustrating an example of data that is arranged in an SPI-Flash according to the embodiment.

Note that in the present embodiment, the BIOS 360 includes the first verification range setting region 403, the first verification range setting region signature value 402, the first BIOS signature value 401, and first embedded controller software 350 as illustrated in FIG. 4. In addition, the BIOS GC 404 includes the second verification range setting region 408, the second verification range setting region signature value 407, the second BIOS signature value 406, and second embedded controller software 405. Therefore, other information is rewritten at once and at the same time as the rewriting of the BIOS GC 404.

After completing the processes of the above functions, the embedded controller software 350 transmits a reset signal to the CPU 201 in order to transfer control to the CPU 201 and enters the sleep state.

Next, the functions performed by the CPU 201 are described. The CPU 201 executes the BIOS 360 stored in the SPI-Flash1 213. The CPU 201 executes a loader 370, an initrd 380, and a kernel 390 that are stored in the Flash ROM 211 after reading these into the DRAM 202. The CPU 201 executes controller software 300 that is stored in the Flash ROM 211 after reading it into the DRAM 202. The BIOS 360 performs basic processes for the CPU 201 to control the I/O controller 203 and the DRAM 202. Further, the BIOS 36i0 includes a process of reading and initiating the loader 370 from the Flash ROM 211. The loader 370 performs the process of reading and starting the kernel 390 and the initrd 380 of the OS from the Flash ROM 211. The initrd 380 executes the process of reading and initiating the controller software 300 from the Flash ROM 211.

An operation control unit 301 displays a screen image for the user on the operation unit 102, and executes processes associated with detection of user operations and screen components such as buttons that are displayed on the screen. A data storage unit 302 stores and reads data to and from the Flash ROM 211 in response to requests from another control unit. For example, when the user wants to change any device setting, the operation control unit 301 detects the content that the user inputted to the operation unit 102, and the data storage unit 302 stores the changed setting values in the Flash ROM 211 in response to requests from the operation control unit 301.

A job control unit 303 controls job execution in accordance with an instruction from another control unit.

An image processing unit 304 processes image data into a format that is suitable for each usage in accordance with an instruction from the job control unit 303. A print processing unit 305 prints an image onto a paper medium via the printer I/F 207 in accordance with an instruction from the job control unit 303 and outputs it. A read processing unit 306 reads a placed original via the scanner I/F 208 in accordance with to an instruction from the job control unit 303.

A network control unit 307 performs network settings, such as an IP address, for a TCP/IP control unit 308 at the time of system startup or at the time a setting change is detected in accordance with the setting values that are stored in the data storage unit 302. The TCP/IP control unit 308 performs the process of transmitting and receiving network packets via the network I/F 204 in accordance with an instruction from another control unit. A USB control unit 309 controls the USB I/F 209 and controls any device that is connected over USB.

A second update unit 310 updates the BIOS 360 that the SPI-Flash1 213 holds. As for a specific update method, it is possible to realize an update by overwriting the BIOS 360 in the SPI-Flash1 213 with the BIOS for update, which has been acquired via a network or a USB memory, for example. Similarly, first version information and the first signature value 402 in the SPI-Flash1 213 are updated with the version information and the signature value of the BIOS for update, which are attached to the BIOS for update. After completing the process of updating the BIOS, the second update unit 310 requests a restart in order to update the BIOS GC 404 in the first update unit 355, which has been described above.

The functional configuration in the present embodiment has been thus described.

<Example of Data>

Here, data that is arranged in the SPI-Flash1 213, which is a first storage medium, and in the SPI-Flash2 214, which is a second storage medium, is given as an example in FIG. 4.

The SPI-Flash1 213 can be accessed from the CPU 201 and the embedded controller 212. The SPI-Flash1 213 holds the BIOS 360, the first verification range setting region 403, the first verification range setting region signature value 402, the first BIOS signature value 401, and the first embedded controller software 350. The first verification range setting region 403 is a region that is not rewritten after the information processing apparatus is activated.

In the present embodiment, a configuration in which the BIOS 360 encompasses the verification range setting region of the BIOS 360 as the first verification range setting region 403 is described; however, this is merely an example. The first verification range setting region 403 and the first verification range setting region signature value 402 may be held in the SPI-Flash1 213 in a form in which they are separated from the BIOS 360 without being included in the BIOS 360. The first BIOS signature value 401 is a digital signature value that is related to the BIOS 360 and is used for the alteration detection unit 351 to verify whether the BIOS 360 has been altered as described above.

Meanwhile, the SPI-Flash2 214 can be accessed only from the embedded controller 212. The SPI-Flash2 214 holds the BIOS GC 404, the second verification range setting region 408, the second verification range setting region signature value 407, the second BIOS signature value 406, and the second embedded controller software 405. The second verification range setting region 408 is a region that is not rewritten after the information processing apparatus is activated. In the present embodiment, similarly to the above, a configuration in which the BIOS GC 404 encompasses the verification range setting region of the BIOS GC 404 as the second verification range setting region 408 is described. Similarly, the second BIOS signature value 406 is a digital signature value for the BIOS GC 404.

Here, the BIOS GC 404 is binary data that is used for restoring the BIOS 360 to a normal state in the restoration unit 352 as described above. Normally, the BIOS GC 404, the second verification range setting region 408, the second verification range setting region signature value 407, the second BIOS signature value 406, and the second embedded controller software 405 are respectively the same binary data (copy data) as the BIOS 360, the first verification range setting region 403, the first verification range setting region signature value 402, the first BIOS signature value 401, and the first embedded controller software 350 in the SPI-Flash1 213 unless there is alteration or data loss or at the time of startup immediately after an update of the BIOS 360.

<Process>

Figure 7A:
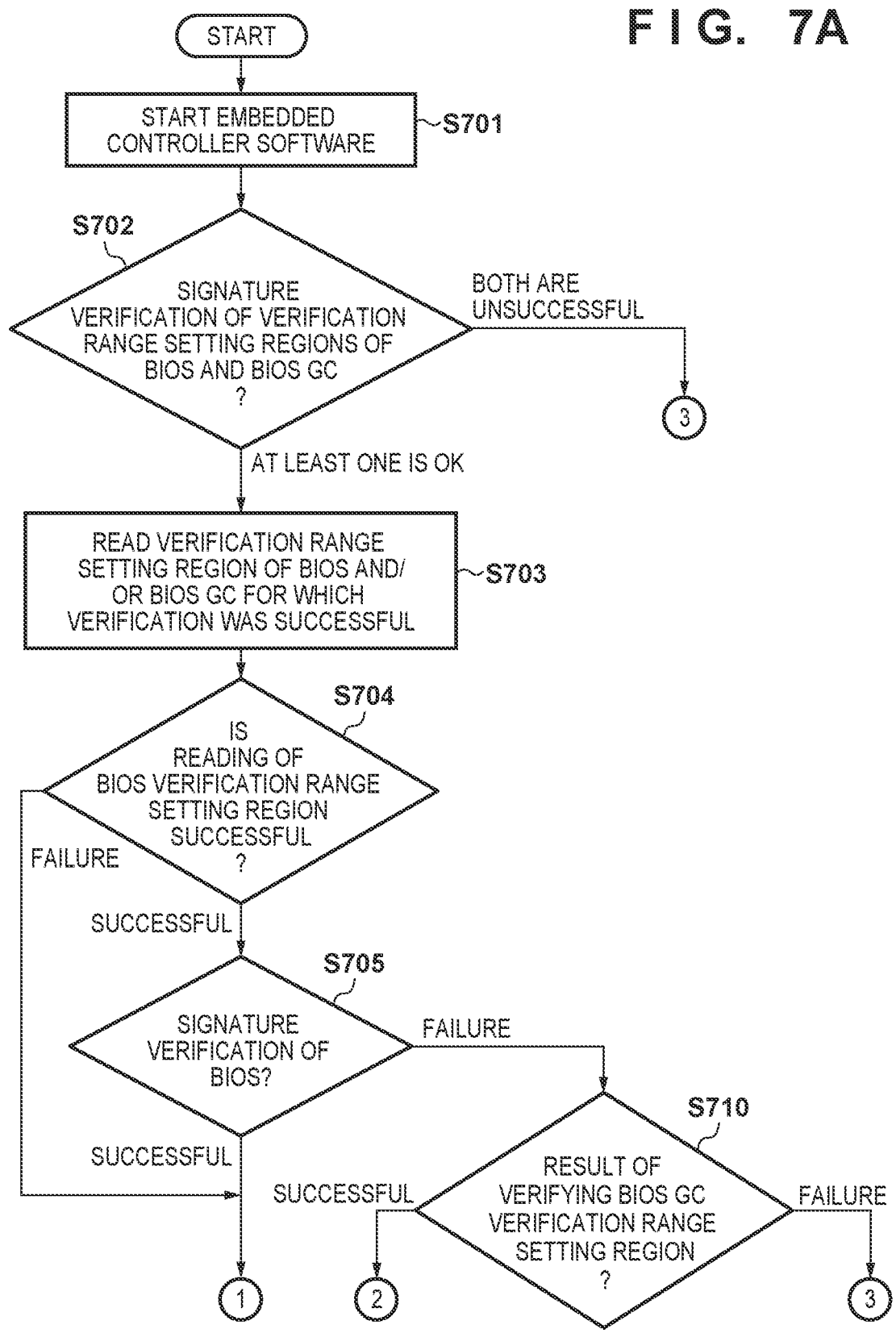

Next, the process of detecting alteration of software, restoring the altered software, and updating the software for restoration according to the present embodiment is described with reference to the flowchart of FIG. 7A and FIG. 7B. This process is mainly executed by the embedded controller 212.

After the power of the MFP 100 is turned on, the embedded controller 212 first starts the embedded controller software 350 (step S701). The alteration detection unit 351 respectively verifies by signature verification whether or not the first verification range setting region 403 of the first boot code (BIOS 360) and the second verification range setting region 408 of the second boot code (BIOS GC 404) have been altered (step S702). For the verification, the first verification range setting region signature value 402 and the second verification range setting region signature value 407 are used.

If the signature verification of both the first verification range setting region 403 and the second verification range setting region 408 is unsuccessful (unsuccessful in step S702), the process of starting the MFP 100 is stopped and startup failure is notified (step S716). As for the notification, a log may be saved, or an occurrence of an error may be notified to the user by an error notification via the operation unit 102, flashing of an LED or a power lamp with which the MFP 100 and the embedded controller 212 are provided, or the like.

Meanwhile, if the signature verification of at least one of the first verification range setting region 403 and the second verification range setting region 408 is successful (at least either is successful in step S702), the setting region reading unit 353 stores whether or not the verification is successful.

Then, the setting region reading unit 353 reads the first verification range setting region 403 and/or the second verification range setting region 408, for which verification has/have been successful (step S703).

The setting region reading unit 353 determines whether or not verification of the first verification range setting region 403 is successful (reading is successful) (step S704).

If the verification of the first verification range setting region 403 is successful and the reading of the information is successful (YES in step S704), the alteration detection unit 351 verifies whether or not the BIOS 360 has been altered (step S705). At the time of verification, the hash value is calculated using the number of verification ranges, verification range start addresses, and verification range sizes of the first verification range setting region 403 that has been read in step S703. Reading from the verification range start address until the range of the verification range size of the SPI-Flash1 213 and then executing an Update process of a hash function are repeated for the number of verification ranges. Finally, a Finalize process of the hash function is executed, and the hash value is calculated and then used for the verification process.

Meanwhile, if the verification of the first verification range setting region 403 is unsuccessful or the reading of information is unsuccessful (unsuccessful in step S704), the process proceeds to step S706.

If the verification of the BIOS 360 is unsuccessful (unsuccessful in step S705), then the process proceeds to step S710. If the verification of the BIOS 360 is successful, the process proceeds to step S706.

In step S710, the setting region reading unit 353 determines whether the result of signature verification of the second verification range setting region 408 performed in step S702 is unsuccessful or successful. If it is unsuccessful (unsuccessful in step S710), the process of starting the MFP 100 is stopped and startup failure is notified (step S716).

Meanwhile, if the result of signature verification of the second verification range setting region 408 is successful (successful in step S710), the alteration detection unit 351 performs a signature verification of the BIOS GC 404 in order to confirm the authenticity of the BIOS GC 404 (step S711). For verification, the number of verification ranges, verification range start addresses, and verification range sizes of the second verification range setting region 408 that has been read in step S703 are used.

If the verification is unsuccessful (unsuccessful in step S711), the process of starting the MFP 100 is stopped and startup failure is notified (step S716). Meanwhile, if the verification is successful (successful in step S711), the process proceeds to step S712. The restoration unit 352 performs the processing of restoring the BIOS 360 (step S712). After restoration, the signature verification of the BIOS 360 is performed in order to confirm that the restoration has been executed properly (step S713). At this time, the first verification range setting region 403 is verified again, read again, and then verified using the number of verification ranges, the verification range start addresses, and the verification range sizes of the first verification range setting region 403 that has been read. If the verification is unsuccessful (unsuccessful in step S713), the process of starting the MFP 100 is stopped and startup failure is notified (step S716). Meanwhile, if the verification is successful (successful in step S713), the process proceeds to step S707.

Then, the embedded controller 212 transmits a reset signal to the CPU 201 in order to transfer control to the CPU 201 (step S707). Then, the embedded controller 212 enters the sleep state (step S708). Upon receiving the reset signal, the CPU 201 starts, and then the CPU 201 reads and starts the BIOS 360 of the SPI-Flash1 213. Then, the CPU 201 executes the loader 370, the initrd 380, and the kernel 390 that are stored in the Flash ROM 211 after reading these into the DRAM 202, and then starts the OS. Then, the CPU 201 executes the controller software 300 that is stored in the Flash ROM 211 after reading it into the DRAM 202 (step S709).

In addition, in step S706, the process branches in accordance with a predetermined decision table (for example, FIG. 6 to be described later). The embedded controller software 350 determines the subsequent processes based on the result of comparing the version information of the first verification range setting region 403 and the second verification range setting region 408. Alternatively, the subsequent processes are determined in accordance with the result of signature verification of the first verification range setting region 403 or the result of signature verification of the second verification range setting region 408 performed in step S702.

For example, (1) if the result of signature verification of the first verification range setting region 403 is unsuccessful, it is determined that the BIOS 360 has been altered. The alteration detection unit 351 performs signature verification of the BIOS GC 404 (step S711) and confirms the authenticity of the copy source, and then the restoration unit 352 restores the BIOS 360 (step S712).

(2) When the version information differs or the result of signature verification of the second verification range setting region 408 is unsuccessful, the first update unit 355 updates the BIOS GC 404 (step S714). After the update, the alteration detection unit 351 performs the signature verification of the BIOS GC 404 in order to confirm that the update has been executed properly (step S715). At this time, the second verification range setting region 408 is verified again, read again, and then verified using the number of verification ranges, the verification range start addresses, and the verification range sizes of the second verification range setting region 408 that has been read. If it is unsuccessful, startup failure is notified (step S716). If it is successful, the process proceeds to the process of transmitting a reset signal (step S707).

(3) When the version information is the same, it is determined that the BIOS GC 404 does not need to be updated, and the process directly proceeds to the process of transmitting a reset signal (step S707).

The table of FIG. 6 illustrates an example of subsequent processes according to the result of comparing the version information of the first verification range setting region 403 (BIOS) and the second verification range setting region 408 (BIOS GC), the result of signature verification of the first verification range setting region 403, the result of signature verification of the second verification range setting region 408, and the result of verifying the BIOS 360.

As illustrated in FIG. 6, when the result of signature verification of the first verification range setting region 403 (BIOS) is successful, the result of signature verification of the second verification range setting region 408 (BIOS GC) is successful, and the result of verifying the BIOS 360 is successful, and when the version information of the first verification range setting region 403 (BIOS) and the second verification range setting region 408 (BIOS GC) differs, the BIOS GC 404 is updated.

When the result of signature verification of the first verification range setting region 403 (BIOS) is successful, the result of signature verification of the second verification range setting region 408 (BIOS GC) is unsuccessful, and the result of verifying the BIOS 360 is successful, the BIOS GC 404 is updated. When the result of signature verification of the first verification range setting region 403 (BIOS) is successful, the result of signature verification of the second verification range setting region 408 (BIOS GC) is successful, and the result of verifying the BIOS 360 is unsuccessful, the BIOS 360 is restored.

When the result of signature verification of the first verification range setting region 403 (BIOS) is successful, the result of signature verification of the second verification range setting region 408 (BIOS GC) is unsuccessful, and the result of verifying the BIOS 360 is unsuccessful, startup failure is notified. When the result of signature verification of the first verification range setting region 403 (BIOS) is unsuccessful, and the result of signature verification of the second verification range setting region 408 (BIOS GC) is successful, the BIOS 360 is restored.

When the result of signature verification of the first verification range setting region 403 (BIOS) is unsuccessful, and the result of signature verification of the second verification range setting region 408 (BIOS GC) is unsuccessful, startup failure is notified. The series of processes in FIG. 7A and FIG. 7B has been thus described.

As described above, in the present embodiment, a verification range setting region (a region that is not affected even if the setting value of the boot code is rewritten) in which non-continuous verification ranges can be written is provided. Then, if the signature verification of the verification range setting region is successful, the verification range setting region is read, and a signature verification is performed for the BIOS using that verification range.

This makes it possible, at the time of performing the processing of verifying whether or not software has been altered and then restoring the software, to execute verification even if the setting value of the boot code of the software has been rewritten.

[Variation 1]

In the above embodiment, whether or not the BIOS 360 has been altered was verified using the number of verification ranges, the verification range start addresses, and the verification range sizes of the first verification range setting region 403 after the alteration detection unit 351 has verified the first verification range setting region 403. In the present variation, the verification range setting region itself is further included in the verification ranges that the verification range setting region specifies.

For example, the verification range specified by the first verification range setting region 403 may include the first verification range setting region 403 itself, and the verification range specified by the second verification range setting region 408 may include the second verification range setting region itself.

This variation makes it possible to detect attacks in which the signature verification is caused to fail by rewriting to a verification range setting region that was generated for a BIOS of another version and has a different verification range and the signature value of the verification range setting region. In addition, it is also possible to prevent attacks in which verification is made successful using an altered BIOS by replacing with a verification range setting region that was generated for a BIOS of another version and has a narrow verification range and the signature value of the verification range setting region. The processing flow that uses the generated signature value is the same as the process of FIG. 7A and FIG. 7B.

[Variation 2]

Further, including the first embedded controller software 350 in the verification range that the verification range setting region specifies makes it possible to prevent a rollback attack in which replacement with the embedded controller software 350 of another version is performed.

For example, the embedded controller 212 operates in accordance with the embedded controller software 350 that executes each process of the information processing apparatus (MFP 100) according to the above embodiment. The verification range specified by the first verification range setting region 403 and the verification range specified by the second verification range setting region 408 may include the embedded controller software 350. The processing flow that uses the generated signature value is the same as the process of FIG. 7A and FIG. 7B.

[Variation 3]

In the above-described embodiment, alteration detection was performed using a signature value that was generated from a single hash value, which was generated by executing a hash function for a non-continuous verification range. As for other realization methods, it is possible to generate a hash value and a signature value for each partitioned verification range and used these for verification.

Note that although description has been given in the above embodiment and each of the variations using BIOS as an example, the present invention can be applied to firmware and software (programs) other than BIOS. For example, if the MFP 100 comprises an NIC, a bus is connected such that the embedded controller 212 can access the firmware of the NIC. Then, configuration is taken such that the golden copy of the NIC firmware is stored in an SPI-Flash that can be accessed only from the embedded controller 212. This makes it possible to realize the restoration of the NIC firmware and update of the golden copy of the NIC firmware.

Further, in the above embodiment and the variations thereof, description has been made using an example in which the embedded controller 212 directly starts the embedded controller software 350; however, it may be started over multiple stages. For example, startup can be performed over multiple stages by storing software for detecting alteration (signature verification) of the embedded controller software 350 and software for starting up the embedded controller software 350 in the ROM of the embedded controller 212. Accordingly, the software for startup, which is initially stored in the ROM of the embedded controller 212, starts and verifies whether or not the embedded controller software 350 stored in the SPI-Flash has been altered. Then, the embedded controller software 350 can be controlled to start only when there is no alteration. Note that in this case, the digital signature value of the embedded controller software 350 is separately stored in the SPI-Flash.

According to the present invention, it becomes possible, at the time of performing the processing of verifying whether or not software has been altered and then restoring the software, to execute verification even if the setting value of the boot code of the software and the like has been rewritten.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-191893, filed Nov. 18, 2020, which is hereby incorporated by reference herein in its entirety.

What is claimed is:

1. An information processing apparatus comprising:
one or more processors; and
one or more memories including a first storage medium configured to hold a first boot code and a second storage medium configured to hold a second boot code that is used to restore the first boot code, the one or more memories storing instructions that, when executed by the one or more processors, cause the one or more processors to perform the functions of:
a first verification function configured to verify whether or not a first verification range setting region that specifies a verification range of the first boot code and a second verification range setting region that specifies a verification range of the second boot code have been altered;
a second verification function configured to, in a case where the first verification range setting region has not been altered, verify whether or not the first boot code has been altered;
a third verification function configured to, in a case where the first boot code has been altered and the second verification range setting region has not been altered, verify whether or not the second boot code has been altered; and
a restoration function configured to, in a case where the second boot code has not been altered, restore the first boot code using the second boot code, wherein
the first verification range setting region and the second verification range setting region are regions that are not rewritten after a start of the information processing apparatus.

2. The information processing apparatus according to claim 1, wherein
the third verification function, in a case where the first verification range setting region has been altered, verify whether or not the second boot code has been altered, and
the restoration function, in a case where the second boot code has not been altered, restores the first boot code using the second boot code.

3. The information processing apparatus according to claim 1, wherein the one or more memories further store instructions that cause the one or more processors to perform the functions of:
an update function configured to update the second boot code using the first boot code, wherein
the update function, in a case where the first verification range setting region has not been altered, the first boot code has not been altered, and the second verification range setting region has been altered, performs an update.

4. The information processing apparatus according to claim 1, wherein the one or more memories further store instructions that cause the one or more processors to perform the functions of:
a comparison function configured to compare version information of the first boot code that is included in the first verification range setting region and version information of the second boot code that is included in the second verification range setting region; and
an update function configured to, in a case where the version information of the first boot code and the version information of the second boot code are different, update the second boot code using the first boot code, wherein
the comparison function, in a case where the first verification range setting region has not been altered, the first boot code has not been altered, and the second verification range setting region has been altered, performs a comparison.

5. The information processing apparatus according to claim 1, wherein the one or more memories further store instructions that cause the one or more processors to perform the functions of:
- a stop function configured to, in a case where both the first verification range setting region and the second verification range setting region have been altered, stop the process of starting the information processing apparatus.

6. The information processing apparatus according to claim 1, wherein the one or more memories further store instructions that cause the one or more processors to perform the functions of:
- a fourth verification function configured to, after a process of restoring the first boot code using the second boot code has been executed by the restoration function, verify whether or not the first boot code has been altered; and
- a stop function configured to, in a case where it has been verified by the fourth verification function that the first boot code has been altered, stop a process of starting the information processing apparatus.

7. The information processing apparatus according to claim 1, wherein
- the second verification function verifies whether or not the first boot code has been altered using a first signature value that is stored in the first storage medium, and
- the third verification function verifies whether or not the second boot code has been altered using a second signature value that is stored in the second storage medium.

8. The information processing apparatus according to claim 1, wherein the first boot code is a BIOS, and the second boot code is a BIOS golden copy.

9. The information processing apparatus according to claim 1, wherein
- the verification range that is specified by the first verification range setting region includes the first verification range setting region itself, and
- the verification range that is specified by the second verification range setting region includes the second verification range setting region itself.

10. The information processing apparatus according to claim 1, wherein
- the information processing apparatus comprises an embedded controller that operates in accordance with embedded controller software that functions as each unit of the information processing apparatus, and
- the verification range specified by the first verification range setting region and the verification range specified by the second verification range setting region includes the embedded controller software.

11. A control method of an information processing apparatus provided with a first storage medium configured to hold a first boot code and a second storage medium configured to hold a second boot code that is used to restore the first boot code, the method comprising:
- performing a first verification of verifying whether or not a first verification range setting region that specifies a verification range of the first boot code and a second verification range setting region that specifies a verification range of the second boot code have been altered;
- in a case where the first verification range setting region has not been altered, performing a second verification of verifying whether or not the first boot code has been altered;
- in a case where the first boot code has been altered and the second verification range setting region has not been altered, performing a third verification of verifying whether or not the second boot code has been altered; and
- in a case where the second boot code has not been altered, restoring the first boot code using the second boot code, wherein
- the first verification range setting region and the second verification range setting region are regions that are not rewritten after a start of the information processing apparatus.

12. A computer-readable storage medium storing program code for causing a computer to execute a control method of an information processing apparatus provided with a first storage medium configured to hold a first boot code and a second storage medium configured to hold a second boot code that is used to restore the first boot code, the program code comprising code to cause the computer to perform the functions of:
- performing a first verification of verifying whether or not a first verification range setting region that specifies a verification range of the first boot code and a second verification range setting region that specifies a verification range of the second boot code have been altered;
- in a case where the first verification range setting region has not been altered, performing a second verification of verifying whether or not the first boot code has been altered;
- in a case where the first boot code has been altered and the second verification range setting region has not been altered, performing a third verification of verifying whether or not the second boot code has been altered; and
- in a case where the second boot code has not been altered, restoring the first boot code using the second boot code, wherein
- the first verification range setting region and the second verification range setting region are regions that are not rewritten after a start of the information processing apparatus.

* * * * *